United States Patent
Brautsch et al.

(10) Patent No.: US 7,434,403 B2
(45) Date of Patent: Oct. 14, 2008

(54) METHOD OF OPERATING A THERMAL POWER PLANT

(75) Inventors: Andreas Brautsch, Wuerenlingen (CH); Patrick Queloz, Magden (CH); Bernd Socher, Zeihen (CH); Floris M. Azn. Van Straaten, Eggenwil (CH)

(73) Assignee: Alstom Technology Ltd, Baden (CH)

( * ) Notice: Subject to any disclaimer, the term of this patent is extended or adjusted under 35 U.S.C. 154(b) by 42 days.

(21) Appl. No.: 11/529,626

(22) Filed: Sep. 29, 2006

(65) Prior Publication Data
US 2007/0062200 A1 Mar. 22, 2007

Related U.S. Application Data

(63) Continuation of application No. PCT/EP2005/051382, filed on Mar. 24, 2005.

(30) Foreign Application Priority Data
Mar. 31, 2004 (CH) .................... 0556/04

(51) Int. Cl.
*F02C 3/20* (2006.01)
(52) U.S. Cl. .............. 60/772; 60/39.281; 60/39.3; 60/775
(58) Field of Classification Search .......... 60/772, 60/773, 776, 39.281, 39.3, 775
See application file for complete search history.

(56) References Cited

U.S. PATENT DOCUMENTS

| | | | |
|---|---|---|---|
| 5,272,637 A | 12/1993 | Urushidani et al. | |
| 5,307,620 A | 5/1994 | Hamahira et al. | |
| 5,609,016 A * | 3/1997 | Yamada et al. | 60/39.281 |
| 6,082,095 A | 7/2000 | Akimaru | |
| 6,145,318 A | 11/2000 | Kaplan et al. | |
| 6,484,490 B1 | 11/2002 | Olsen et al. | |

FOREIGN PATENT DOCUMENTS

| | | |
|---|---|---|
| DE | 846 038 | 8/1952 |
| DE | 42 11 681 A1 | 10/1992 |

(Continued)

OTHER PUBLICATIONS

International Search Report dated Jun. 23, 2005.

(Continued)

*Primary Examiner*—Ted Kim
(74) *Attorney, Agent, or Firm*—Buchanan Ingersoll & Rooney PC

(57) ABSTRACT

A method of operating a thermal power plant, such as a gas turbine power plant, in which a rotary unit, such as at least one gas turbine stage, is driven by burning gaseous fuel inside a combustion chamber, with hot gases being formed, the rotary energy of which rotary unit is converted into another form of energy, such as into electrical energy. A load set point (L) of the thermal power plant is set by regulating the quantity of gaseous fuel fed to the combustion process. The thermal power plant is operated at a load set point (L), provided the gaseous fuel is fed to the combustion process through a gas line at a gas pressure $p_{gas}$, with $$p_{gas} > p_{action\ limit}(L),$$

where $p_{action\ limit}(L)$ represents a pressure value which depends at least on the load set point (L) of the thermal power plant.

18 Claims, 2 Drawing Sheets

FOREIGN PATENT DOCUMENTS

| | | |
|---|---|---|
| DE | 42 21 805 A1 | 1/1994 |
| DE | 195 49 141 A1 | 7/1997 |
| EP | 1 310 647 A1 | 5/2003 |
| GB | 1093793 | 12/1967 |

OTHER PUBLICATIONS

Form PCT/ISA/237 (Written Opinion of the International Searching Authority).

Swiss Search Report dated Jun. 25, 2004 (with English translation of category of cited documents).

* cited by examiner

METHOD OF OPERATING A THERMAL POWER PLANT

CROSS-REFERENCE TO RELATED PATENT APPLICATIONS

This application claims the benefits of Swiss Patent Application No. 00556/04, filed on Mar. 31, 2004, is a continuation of and International Patent Application No. PCT/EP2005/051382, filed Mar. 24, 2005, the disclosure of which are incorporated herein in their entireties by reference.

TECHNICAL FIELD

The invention relates to a method of operating a thermal power plant, preferably a gas turbine power plant, in which method hot gases are produced by the firing of a combustion chamber, the kinetic fluidic energy of which is converted at least partly during flow through a rotary machine into rotary energy and ultimately, by means of a generator arrangement connected to the rotary machine, into electrical energy for feeding into a power grid.

For reasons of safety, but likewise also for economical reasons, it is necessary to reliably operate a thermal power plant conceived for the generation of electrical energy, so that the operating agency of the thermal power plant can rapidly call for electrical energy on demand. As already mentioned above, gas turbine power plants are the focus of further considerations; such thermal power plants are after all widely used for power generation. In most cases, gas turbine power plants are fired with gaseous fuel, which is provided via suitable gas lines for combustion in the gas turbine power plant.

In a gas turbine power plant operated with gaseous fuel, special consideration is given to the pressure ratio between the system pressure arising inside the combustion chamber as a function of the load set point of the gas turbine power plant by means of the compression of the combustion supply air and the gas line pressure at which the gaseous fuel is fed to the combustion process. Under normal operating conditions, the gas line pressure is always greater than the load-dependent combustion chamber pressure. In cases in which the gas line pressure of the fed fuel drops into the range of the load-dependent combustion chamber pressure, it is especially necessary to make sure that a drop in the gas line pressure below the combustion chamber pressure can be avoided at all events. If the gas line pressure were to drop below the combustion chamber pressure, a flashback of flame into the gas feed line would occur, as a result of which the operating safety of the entire fuel supply is put at risk. Hot gases could at least penetrate into the fuel feed line system, as a result of which the fuel feed comes to a complete standstill and the burner flame is extinguished. In this case, the gas turbine power plant is out of commission for further power generation for a considerable period, especially since extensive and time-consuming measures are necessary in order to run the plant up to speed again until a required rated load is reached.

For said reasons, care is therefore to be taken to avoid the consequences of the with the drop in the gas line pressure below the combustion chamber operating pressure.

In order to protect gas turbine power plants from the consequences of an unforeseen pressure drop in the gas feed line, very strict operating limits have been established, which, if they are exceeded or not reached, respectively in the event of a pressure drop in a gas feed line, automatically lead to the initiation of a protective measure, namely immediate deloading of the gas turbine by reduction of the fuel feed until the gas turbine power plant is completely shut down. This measure certainly serves for protection against irreversible damage to individual gas turbine components, in particular to all those which participate in the combustion process, but the complete deloading of the gas turbine power plant leads to a considerable reduction in the economical availability, which, however, is becoming increasingly important on account of the competition conditions, which are invariably becoming tougher.

Some gas turbine power plants provide "fuel compressor stages", by means of which the supply gas pressure can always be kept at a pressure level ensuring the reliable operation of the gas turbine power plant. Such fuel compressor stages may be connected to the system as and when required in order to stabilize the supply gas pressure at a requisite level in cases where a drop in the supply gas pressure occurs relative to the requisite variable gas pressure, which not only depends on the load set point of the gas turbine but is also subject to other parameters, such as, for example, the ambient temperature, fuel temperature, air humidity, to mention only a few. However, from the point of view of the generation of energy, connection of a fuel compressor stage is undesirable, especially since this means that a considerable proportion of the energy generated by the gas turbine power plant has to be applied for driving the fuel compressor unit, as a result of which the overall energy efficiency of the gas turbine power plant is considerably reduced.

SUMMARY OF THE INVENTION

The object is therefore to specify a method of operating a thermal power plant, in particular for operating a gas turbine power plant, by means of which ultimately electrical energy can be generated for feeding into a power grid, in such a way that the availability of the thermal power plant is to be improved, i.e., in particular in cases in which the gas line pressure in the fuel supply system drops, it is necessary to search for alternative control mechanisms which do not necessarily lead to an emergency shutdown of the entire thermal power plant. Likewise, the use of energy-consuming fuel compressor stages is to be avoided in order to be able to maintain the operation of the thermal power plant, even in cases where the fuel supply pressure drops, largely without drastic loss of energy. In addition, however, it is likewise necessary to fully comply with the safety standards which are imposed on a thermal power plant in operation.

The general idea of the invention relates in principle to all thermal power plants in which hot gases are produced by burning gaseous fuel inside a combustion chamber, by means of which hot gases a rotary unit is driven, the rotary energy of which is converted into another form of energy, preferably into electrical energy. In this case, the rotary energy inherent in the rotary unit represents the "load set point" of the thermal power plant, which load set point is set by regulating the quantity of the gaseous fuel fed to the combustion process and can be regarded as an equivalent variable for the electrical energy fed into a power supply grid. Depending on the energy demand prevailing in the power grid, the load set point is to be correspondingly adapted by regulating the fuel feed. In addition, further measures serving to increase the output of thermal power plants are also known, by means of which measures the combustion process can be optimized without increasing the fuel feed itself. Thus, by specific feeding of steam into the fuel/air mixture being ignited inside the combustion chamber, the mass flow can be increased and the volume of the hot gases produced by the combustion process can be increased. At the same time, the steam feeding serves to cool all the plant components participating in the combustion process. The cooling of the combustion supply air fed to the combustion process offers a further measure for increasing the output. Colder air has a higher density and therefore a higher oxygen proportion than warmer air. It is evident that the combustion process in the presence of greater oxygen quantities is effected with better burn-out results. Specific cooling of the gaseous fuel fed to the combustion process also helps to increase the fuel density and thus increase the burner efficiency.

Without restricting the general idea of the invention with regard to the mode of operation of thermal power plants of the generic type, the further comments are directed toward a gas turbine power plant which is designed for the generation of electrical energy and which is to be regarded as being typical of the thermal power plant in question.

If a pressure drop in the fuel supply pressure occurs, the method according to the invention according to the preamble of patent claim 1, in deviation from the previous measures which help to stabilize the fuel supply pressure and protect the entire gas turbine power plant from irreversible damage, makes provision in a first step for first of all those measures to be reduced or completely shut off which help to increase the output of the gas turbine power plant and do not concern the fuel quantity fed to the combustion process.

The thermal power plant is thus operated in the normal case at a load set point, provided the gaseous fuel is fed to the combustion process through the supply gas line at a gas pressure $p_{gas}$ which is to be greater than a critical pressure value $p_{action\ limit}$, which itself depends on the load set point of the gas turbine power plant. If the case occurs where the supply gas pressure $p_{gas}$ drops to the critical pressure value $p_{action\ limit}$, at least one of the following measures is initiated according to the invention in a first step:

- throttling of the cooling of the combustion air, which is burned for forming the mixture with the fuel,
- throttling of the steam admixing to the fuel/air mixture to be burned, and
- throttling of the cooling of the steam to be admixed to the fuel/air mixture.

All the above measures jointly and individually help to relieve the combustion process, as a result of which the combustion chamber pressure and thus ultimately also the critical pressure value $p_{action\ limit}$ are reduced. These measures have an effect on the operating behavior of the gas turbine in the same way as if the ambient temperature at which the gas turbine power plant works were to be increased.

If the supply gas pressure is stabilized in the desired manner by the initiation of the above measures, the measures can be reduced again or stopped completely. If reducing individual measures or all the above measures does not lead to the desired result, the combustion air cooling, the steam admixing and the cooling of the steam to be admixed are completely shut down. If individual shutdown measures or all the shutdown measures do not lead to the desired result of stabilization of the fuel supply pressure, active reduction of the fuel temperature is effected in a second step. On account of the increase in the fuel density, a reduction in the fuel temperature leads to a reduction in the fuel volumetric flow and at the same time to a reduction in the pressure losses within the fuel feed.

If the reduction in the fuel temperature should also not lead to the stabilization of or increase in the gas pressure, controlled deloading of the thermal power plant is initiated.

If the gas turbine power plant is at an initial load set point at which the gas line pressure $p_{gas}$ drops, for whatever reasons, and reaches the pressure value $p_{action\ limit}$ predetermined at the initial load set point, "standard deloading" is effected, during which the quantity of gaseous fuel fed to the combustion process is reduced, with a fuel throttle rate depending on the respective type of gas turbine power plant being preset.

The load which prevails at the initial load set point is automatically reduced by this measure, as a result of which the system-related combustion chamber pressure automatically decreases.

Since the reference pressure level $p_{action\ limit}$ depending on the load set point is always above the system-related combustion chamber pressure $p_{system\ requirement}$, which likewise depends on the load set point, the pressure difference provided between both pressure levels permits a type of buffer zone, by means of which the further behavior of the gas pressure $p_{gas}$ prevailing in the gas feed line, in particular in relation to the reference pressure $p_{action\ limit}$, which depends on the load set point, can be observed before a further measure, such as an emergency shutdown for example, is initiated.

Thus, the further method, depending on a pressure ratio between the gas pressure $p_{gas}$ and the load-dependent reference pressure $p_{action\ limit}$ forming during reduction of the load, makes provision on the basis of a decision criterion either for the standard deloading to be ended and for the gas turbine power plant to be returned to its initial load set point, for complete emergency load shedding to be carried out, during which the fuel reduction is effected more rapidly than in the case of the standard deloading, or for the fuel supply to be changed over to another type of fuel, provided the gas turbine power plant has a dual fuel supply.

If standard deloading which has become necessary due to a drop in the gas pressure $p_{gas}$ to the pressure level $p_{action\ limit}$ leads to stabilization of the gas pressure $p_{gas}$, the gas pressure $p_{gas}$ always being greater than the reference pressure $p_{action\ limit}$ due to the load reduction, the gas turbine power plant can be returned again to its initial load set point on the basis of a specific load build-up.

By means of the regulated method, it is therefore possible to safely operate gas turbine power plants even at reduced gas pressure $p_{gas}$ without at the same time initiating an emergency shutdown, as a result of which the availability and ultimately the efficiency of gas turbine power plants can be considerably increased.

Only in cases in which the gas pressure $p_{gas}$ continues to drop despite standard deloading are emergency shutdowns unavoidable in order to ensure safety of operation and the avoidance of irreversible damage. In cases in which gas turbine power plants have a dual fuel supply, i.e. they can be operated with both gaseous and liquid fuel, the fuel supply can be changed over from gas feed to liquid feed as an alternative to the emergency shutdown.

BRIEF DESCRIPTION OF THE INVENTION

The invention is described by way of example below, without restricting the general idea of the invention, with reference to an exemplary embodiment and the drawings, in which.

WAYS OF IMPLEMENTING THE INVENTION, INDUSTRIAL APPLICABILITY

Figure 1:
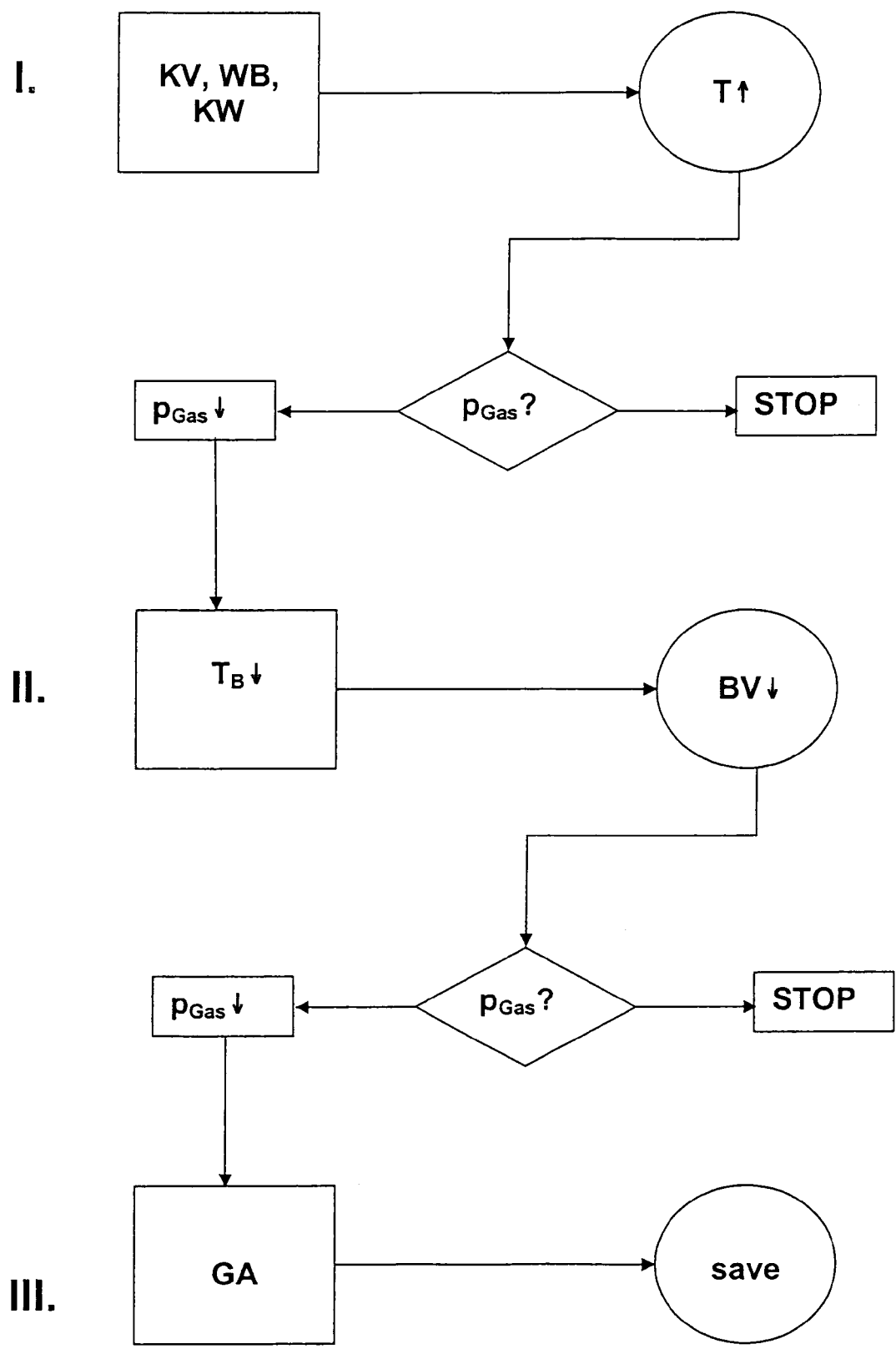
FIG. 1 shows a flow chart for illustrating the method.

Shown in FIG. 1 is a decision flow chart, with reference to which the method according to the invention is to be explained. Not taken into account in the diagram is the normal case, in which the gas turbine power plant works under pressure conditions at which the gas supply pressure is always above a system-related minimum pressure level. However, if the gas pressure drops below the minimum pressure level $p_{action\ limit}$, all the output-increasing measures are reduced or completely shut off in a first step I, i.e. cooling of the combustion air (KV), which is burned for forming the mixture with the fuel, steam admixing (WB) to the fuel/air mixture to be burned, and cooling of the steam (KW) to be admixed to the fuel/air mixture.

Due to the above measures, the gas turbine power plant undergoes a change in the operating range which is equivalent to an increase in the ambient temperature T. If the gas pressure $p_{gas}$ in the supply line should consequently stabilize relative to the minimum pressure level $p_{action\ limit}$, the above measures can be maintained or successively cancelled while monitoring the gas pressure. For the case where the gas pressure continues to drop as before, active reduction of the fuel temperature $T_B$ is effected in step II.

On account of the increase in the fuel density, a reduction in the fuel temperature leads to a reduction in the volumetric fuel flow BV and at the same time to a reduction in the pressure losses within the fuel feed.

Further measures are again made contingent on the behavior of the gas pressure $p_{gas}$. If the gas pressure $p_{gas}$ in the supply line should stabilize relative to the minimum pressure level $p_{action\ limit}$, the temperature reduction can be maintained or successively cancelled while monitoring the gas pressure. For the case where the gas pressure continues to fall as before, controlled deloading (GA) of the gas turbine power plant is effected in step III, which deloading (GA) is initiated in order to avoid damage, puts the gas turbine power plant into an operationally safer state (save) and is described below with reference to FIG. 2.

Figure 2:
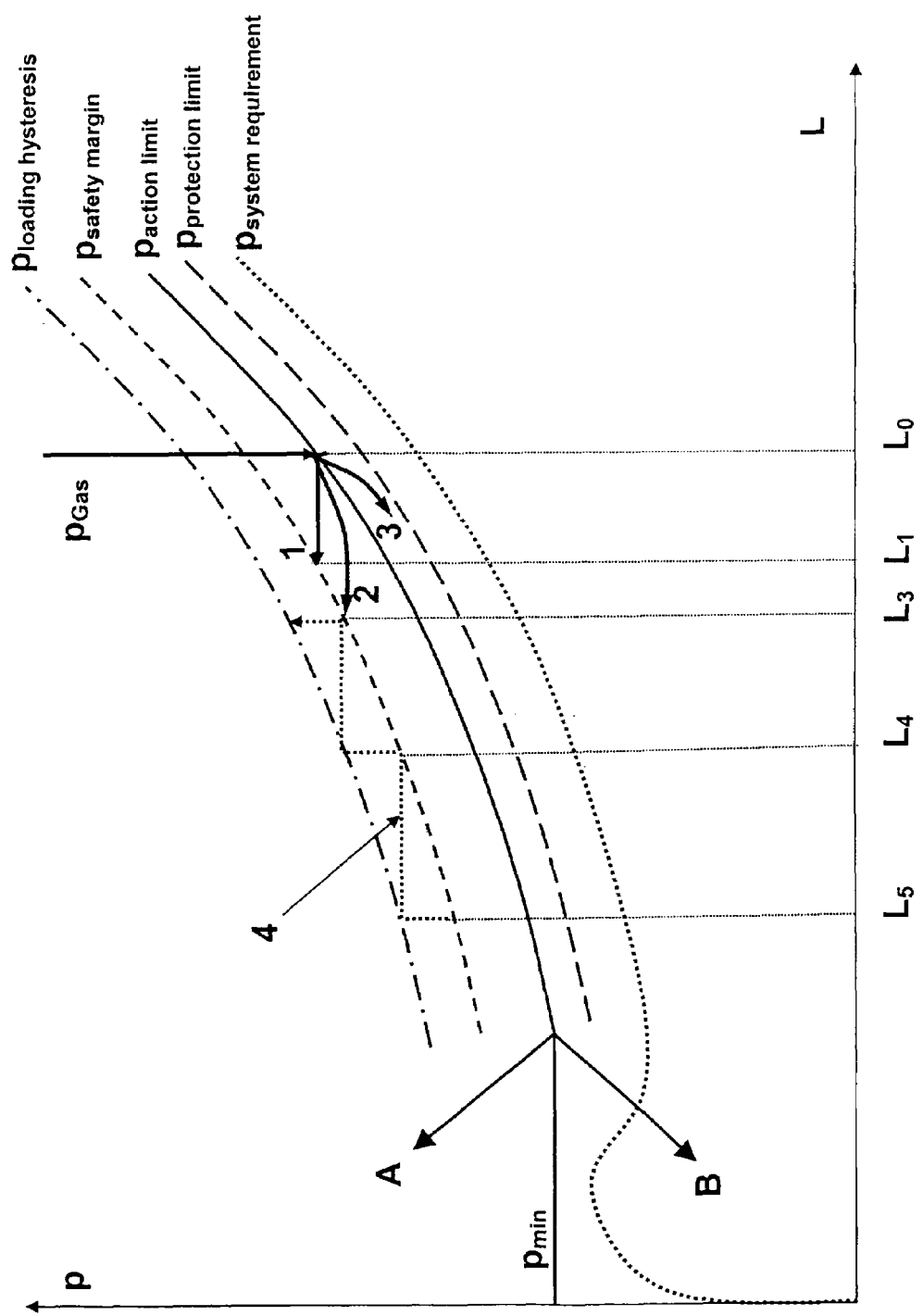
FIG. 2 shows a gas pressure/load diagram for describing the controlled deloading.

FIG. 2 shows a p/L diagram, in which the pressure p is plotted along the ordinate and the load set point L is plotted along the abscissa.

In principle, it is necessary to always keep the gas pressure $p_{gas}$ higher than the system-related combustion chamber pressure $p_{system\ requirement}$ forming as a function of the load set point L if it is intended to prevent the consequences explained at the beginning from occurring, which consequences inevitably lead to irreversible damage to all the components participating in the combustion process.

During the ignition of a gas turbine power plant, care is to be taken to ensure that the gas pressure for the fuel feed has a minimum gas pressure $p_{min}$ which is markedly above the system-related combustion chamber internal pressure $p_{system\ requirement}$ in the region of the lower load set point. If this requirement cannot be met, the ignition spark for the ignition of a fuel/air mixture forming inside the burner is not released for safety reasons.

Starting from the minimum gas pressure $p_{min}$ within the lower load range, a pressure reference line $p_{action\ limit}$ follows within the range of higher loads L, this pressure reference line $p_{action\ limit}$ rising in proportion to the combustion chamber pressure $p_{system\ requirement}$ and being selected in each case to be greater than $p_{system\ requirement}$ irrespective of the respective load set point.

Furthermore, three further pressure lines are depicted in the diagram shown in the figure; these are, in detail: $p_{protection\ limit}$, $p_{safety\ margin}$ and $p_{loading\ hysteresis}$. The additional three pressure lines all run essentially parallel to the reference pressure line $p_{action\ limit}$, the reference pressure line $p_{action\ limit}$ within the middle and higher load range being derived in the following manner from the load-dependent, system-related combustion chamber internal pressure $p_{system\ requirement}$:

$$p_{action\ limit} = p_{system\ requirement} \cdot a, \text{ with } 1.2 \leq a \leq 1.5, \text{ preferably } a=1.35.$$

With regard to the pressure lines additionally provided in the diagram for $p_{protection\ limit}$, $p_{safety\ margin}$ and $p_{loading\ hysteresis}$, the following conditions preferably apply:

$$p_{safety\ margin} = p_{system\ requirement} \cdot a + 1 \text{ bar,}$$

$$p_{loading\ hysteresis} = p_{system\ requirement} \cdot a + 1.3 \text{ bar and}$$

$$p_{protection\ limit} = p_{system\ requirement} \cdot a - 0.3 \text{ bar.}$$

Depending on the type of gas turbine, the factors selected in the above equations may be selected differently.

The normal operation of a gas turbine power plant is effected under sufficiently high gas pressure $p_{gas}$, which at every load set point L is always higher than the reference pressure $p_{action\ limit}$ depending on the load set point. In the normal operating state therefore:

$$p_{gas} > p_{action\ limit}$$

However, if the gas pressure $p_{gas}$ should drop at an initial load set point $L_0$ selected in any desired manner and reach the pressure value $p_{action\ limit}$ at the initial load set point $L_0$, the gas turbine power plant is automatically deloaded on the basis of standardized fuel throttling at a throttle rate $r_1$ depending on the respective gas turbine power plant.

In the case of the standard deloading, the following cases can be distinguished from one another in principle:

Case 1 (see Arrow 1 in the Diagram)

Due to the standard deloading, the gas pressure $p_{gas}$ remains largely constant, so that, by means of the load reduction, when a lower load set point $L_1$ is reached, a relative extra increase in the gas pressure $p_{gas}$ relative to the pressure value $p_{action\ limit}$ at the load set point $L_1$ is set, with: $p_{gas} = p_{safety\ margin}(L_1)$.

The pressure line $p_{safety\ margin}$ serves as a safety pressure level which is always above the reference pressure line $p_{action\ limit}$. If the gas pressure $p_{gas}$ adapts itself to the safety pressure level $p_{safety\ margin}$ due to reduced fuel feed at a reduced load set point $L_1$, the standard deloading is ended. If the gas pressure $p_{gas}$ also remains constant after the standard deloading and maintains the pressure level $p_{safety\ margin}$ at the load set point $L_1$, the gas turbine power plant can again be changed to the initial load set point $L_0$ in the course of a standard load build-up.

On the other hand, if the gas pressure $p_{gas}$ drops again immediately after reaching the pressure level $p_{safety\ margin}$ at the load set point $L_1$ after completion of the standard deloading and approaches the reference pressure level $p_{action\ limit}$ at the load set point $L_1$, repeated standard deloading to a further reduced load set point $L_2$ (not shown in the diagram) is effected. If the gas pressure $p_{gas}$ adapts itself at the reduced load set point $L_2$ to the safety pressure level $p_{safety\ margin}$ prevailing at this load level, the standard deloading is again ended. If the gas pressure $p_{gas}$ stabilizes, a load build-up from the load set point $L_2$ to the initial load set point $L_0$ is started.

However, if the standard deloading measures described above do not lead back to the desired result with regard to gas pressure stabilization, with the gas turbine power plant subsequently being changed to the initial load set point $L_0$, the gas pressure, by step-by-step repetition of the above procedure, reaches the minimum pressure level $p_{min}$, from which further deloading is no longer possible in order to avoid damage.

In this case, only two alternatives A and B remain, namely either an emergency shutdown of the gas turbine power plant, in order to avoid a further drop in the gas pressure below the system-related combustion chamber internal pressure $p_{system\ requirement}$ (case B), or a changeover to an alternative fuel type (case A), for example firing of the combustion chamber with liquid fuel instead of with gaseous fuel. Case A, however, as already mentioned, is only possible in dual burner systems.

The scenario described above describes the case of a pressure loss taking place slowly in the fuel feed line, during which for the most part fuel throttling by means of standard deloading leads to a uniform gas pressure $p_{gas}$, which, when the safety pressure level $p_{safety\ margin}$ is reached, is stabilized again at a reduced load set point $L_1$ and makes it possible to change the gas turbine power plant to the initial load set point.

Case 2 (see Arrow 2 in the Diagram)

If, on the other hand, a marked and rapid drop in the gas pressure $p_{gas}$ occurs, the reference pressure $p_{action\ limit}$ at the initial load set point $L_0$ is reached relatively quickly. The standard deloading described above is effected automatically in the same way by throttling the fuel feed. The gas pressure $p_{gas}$ certainly does not remain constant in such a case, despite the standard deloading, but rather continues to drop dynamically, but at a slower rate than the reference pressure value $p_{action\ limit}$ dropping due to the standard deloading. In this case, too, during the entire standard deloading, the following always applies: $p_{gas} > p_{action\ limit}(L)$. When the safety gas pressure $p_{safety\ margin}$ is reached at a greatly deloaded set point $L_3$, the fuel throttling by means of the standard deloading is ended just as in the case described above. If the gas pressure stabilizes at the load set point $L_3$, the load set point $L_3$ can be changed again to the initial load set point $L_0$ in the course of a standard load build-up. The standard load build-up will be dealt with in more detail further below.

Case 3 (see Arrow 3 in the Diagram)

If, in the event of a pronounced drop in the gas pressure $p_{gas}$ to the reference pressure level $p_{action\ limit}$ at the initial load set point $L_0$, the automatically initiated standard deloading does not lead to desired stabilization of the pressure level within the gas line, and if the gas pressure $p_{gas}$ falls below the reference pressure level $p_{action\ limit}$ despite the standard deloading, an emergency shutdown of the gas turbine power plant becomes unavoidable, in the case of a pressure reduction of the gas pressure $p_{gas}$ to a protective pressure level $p_{protection\ limit}$ which is above the combustion chamber pressure $p_{system\ requirement}$.

In such a case, an emergency shutdown is unavoidable in order to avoid irreversible system damage. As an alternative to the emergency shutdown, the supply of the combustion process with gaseous fuel can be changed over to liquid fuel operation in the case of a dual fuel supply of the gas turbine power plant.

In the case of emergency load relief, the fuel feed is carried out at a far greater throttle rate $r_2$ than in the case of standard deloading. The throttle rate $r_2$ in the case of standard deloading is typically at least 6 times, preferably at least 10 times, the throttle rate $r_1$ which is used during the standard load relief.

In the cases described above in which, by specific standard deloading, the gas pressure $p_{gas}$ can be stabilized at the safety pressure level $p_{safety\ margin}$ which depends on the respective reduced load level, i.e. the gas pressure $p_{gas}$ continues to remain stable for a predeterminable period of at least 1 minute at constant fuel feed, it is necessary to return the gas turbine power plant to the original initial load set point $L_0$. This is effected, as already mentioned, in the course of a standard load build-up, which, as can be seen from the diagram (see dotted line 4), is effected step by step. First of all, it may be noted that the initial load set point $L_0$ at which the pressure drop in the fuel feed line occurred is stored in the system, so that the initial load set point can be specifically restored after corresponding standard deloading. Referring to the diagram, let it be assumed that the reduced load set point adopted by means of the standard deloading is $L_5$, at which the gas pressure $p_{gas}$ has assumed the safety pressure $p_{safety\ margin}$ and increases at uniform load set point $L_5$ to the pressure level $p_{loading\ hysteresis}$, for which: $p_{loading\ hysteresis} > p_{safety\ margin}$, the pressure level $p_{loading\ hysteresis}$ always being greater than the safety pressure level $p_{safety\ margin}$.

When the pressure level $p_{loading\ hysteresis}$ is reached, a standard load build-up is effected by increased fuel feed at a fuel feed rate which depends on the gas turbine power plant and is preferably selected to be constant with respect to time. During the standard load build-up, the gas pressure $p_{gas}$ typically remains constant, the standard load build-up being interrupted when the safety pressure level $p_{safety\ margin}$ is reached at the load set point $L_4$. The gas pressure $p_{gas}$ again increases at the increased load set point $L_4$ until the pressure level $p_{loading\ hysteresis}$ is reached at the load set point $L_4$. The fuel feed is again increased, so that safety pressure level $p_{safety\ margin}$ is reached at the higher load set point $L_3$. The standard load build-up carried out step by step is repeated until the initial load set point $L_0$ is reached.

By means of the method according to the invention, it is possible to improve the availability of gas turbine power plants and to markedly reduce the susceptibility with regard to pressure fluctuations within the fuel feed lines. With the described method, emergency shutdowns will be necessary only rarely, provided the thermal power plant is fired exclusively with gaseous fuel and the pressure drop in the gas line cannot be stabilized despite standard deloading.

In particular in countries and regions in which the supply of gaseous fuel is subject to fluctuations, the method offers a reliable mode of operation of gas-fired thermal power plants, in particular gas turbine power plants.

What is claimed is:

1. A method of operating a thermal power plant in which a rotary unit is driven by burning gaseous fuel inside a combustion chamber where hot gases are formed, and the rotary energy of the rotary unit is converted into another form of energy that defines a load set point (L) of the thermal power plant, the load set point (L) being set by regulating the quantity of gaseous fuel fed to the combustion process, wherein the thermal power plant is operated at the load set point (L), provided the gaseous fuel is fed to the combustion process through a gas line at a gas pressure $$p_{gas} > p_{action\ limit}(L),$$

wherein $p_{action\ limit}$ (L) represents a pressure value which depends at least on the load set point (L) of the thermal power plant, wherein, when the gas pressure $p_{gas}$ drops to the pressure value $P_{action\ limit}$ (L), at least one of the following measures is initiated:

throttling of cooling of combustion air forming an air component in a fuel/air mixture burnt in the combustion chamber;

throttling of steam admixed to the fuel/air mixture; and/or throttling of cooling of the steam admixed to the fuel/air mixture, wherein for the case in which one or more of the above measures have been completely shut off, and stabilization of or increase in the gas pressure $p_{gas}$ is not achieved, a temperature of the gaseous fuel fed to the combustion process is reduced, and for the case in which the reduction in the fuel temperature does not lead to the stabilization of or increase in the gas pressure, a controlled deloading of the thermal power plant is initiated.

2. The method as claimed in claim 1, wherein, if the gas pressure $p_{gas}$ drops below the pressure value $p_{action\ limit}(L_0)$ at an initial load set point ($L_0$), the controlled deloading of the thermal power plant is carried out by standard deloading wherein standard deloading comprises reducing the quantity of gaseous fuel fed to the combustion process, wherein, depending on a pressure ratio between $P_{gas}$ and $P_{action\ limit}(L)$ during deloading, either i) the standard deloading is ended and the thermal power plant is changed to its initial load set point;

ii) complete emergency load shedding is carried out, during which the fuel reduction is carried out more rapidly than during the standard deloading; or iii) the fuel supply is changed over to another type of fuel.

3. The method as claimed in claim 2, wherein, for the case where standard deloading results in $p_{gas}$ equaling $p_{safety\ margin}(L_1)$ at a reduced load set point $L_1$, while:

$$p_{safety\ margin}(L_1) > p_{action\ limit}(L_1),$$

the standard load relief is ended and the thermal power plant is changed to the initial load set point ($L_0$) by increasing the fuel feed.

4. The method as claimed in claim 3, wherein the thermal power plant is changed to the initial load set point $L_0$ by step-by-step increases in the load set point (L) starting from the point where $P_{gas} \geq P_{loading\ hysteresis}$ such that $P_{loading\ hysteresis} > P_{action\ limit}$, including the steps of:

a) increasing load until a load setpoint is reached where $P_{gas} = P_{safety\ margin}$;

b) maintaining new load setpoint until $P_{gas} = P_{loading\ hysteresis}$;

c) repeating steps a) and b) until the initial load set point $L_0$ is reached.

5. The method as claimed in claim 2, wherein, for the case where initially $p_{gas} = P_{action\ limit}(L_0)$, and the standard deloading leads to a drop in the gas pressure $p_{gas}$ to a pressure value $p_{protection\ limit}(L_2)$ at a reduced load set point $L_2$, wherein $P_{system\ requirement}(L_2) < p_{protection\ limit}(L_2) < p_{action\ limit}(L_2)$, wherein $p_{system\ requirement}(L_2)$ is a system internal pressure set in a region of the combustion chamber of the reduced load set point ($L_2$) of the thermal power plant, the complete emergency load shedding or the changeover of the fuel feed to another type of fuel is effected.

6. The method as claimed in claim 5, wherein a standard deload relief is carried out by throttling the fuel feed at a throttle rate $r_1$, and wherein the emergency load relief is carried out at a throttle rate $r_2$, wherein $r_2 \geq 6 \cdot r_1$.

7. The method as claimed in claim 6, wherein the thermal power plant is changed to the initial load set point $L_0$ once the load set point set at $p_{gas} = p_{safety\ margin}(L)$ has stabilized.

8. The method as claimed in claim 7, wherein the thermal power plant is loaded to the initial load set point $L_0$ according to a standard load build-up, provided that:

$$p_{gas} > p_{loading\ hysteresis} \text{ and}$$

$$p_{loading\ hysteresis} > p_{action\ limit}$$

9. The method as claimed in claim 2, wherein a standard deload relief is carried out by throttling the fuel feed at a throttle rate $r_1$, and wherein the emergency load relief is carried out at a throttle rate $r_2$, wherein $r_2 \geq 6 \cdot r_1$.

10. The method as claimed in claim 9, wherein, in cases where: the gas pressure $p_{gas}$ repeatedly drops to a pressure value $p_{action\ limit}(L)$ after $p_{safety\ margin}(L)$ is reached; at least one of the measures i), ii) and/or iii) of claim 2 is carried out repeatedly; and the gas pressure $p_{gas}$ falls below a minimum pressure value $p_{min}$, either the complete emergency load relief is effected or the fuel supply is changed over to another type of fuel.

11. The method as claimed in claim 9, wherein the thermal power plant is changed to the initial load set point $L_0$ once the load set point set at $p_{gas} = p_{safety\ margin}(L)$ has stabilized.

12. The method as claimed in claim 11, wherein the thermal power plant is changed to the initial load set point $L_0$ according to a standard load build-up, provided:

$$p_{gas} \geq p_{loading\ hysteresis} \text{ and}$$

$$p_{loading\ hysteresis} > p_{action\ limit} \text{ and}$$

wherein the standard load build-up is carried out at a fuel feed rate depending on the respective thermal power plant.

13. The method as claimed in claim 12, wherein the thermal power plant is changed to the initial load set point $L_0$ by step-by-step increases in the load set point (L) starting from the point where $P_{gas} \geq P_{loading\ hysteresis}$ such that $P_{loading\ hysteresis} > P_{action\ limit}$, including the steps of:

a) increasing load until a load setpoint is reached where $P_{gas} = p_{safety\ margin}$;

b) maintaining new load setpoint until $P_{gas} = P_{loading\ hysteresis}$;

c) repeating steps a) and b) until the initial load set point $L_0$ is reached.

14. The method of claim 12, wherein the standard load build-up is carried out at a fuel feed rate which is constant with respect to time.

15. The method as claimed in claim 2, wherein the thermal power plant is changed to the initial load set point $L_0$ once the load set point set at $p_{gas} = p_{safety\ margin}(L)$ has stabilized.

16. The method as claimed in claim 2, wherein the thermal power plant is loaded to the initial load set point $L_0$ according to a standard load build-up, provided that:

$$p_{gas} \geq p_{loading\ hysteresis} \text{ and}$$

$$p_{loading\ hysteresis} > p_{action\ limit}$$

17. The method of claim 16, wherein the standard load build-up is carried out at a fuel feed rate which is constant with respect to time.

18. The method of claim 1, wherein the thermal power plant is a gas turbine power plant having a gas turbine stage for converting rotary energy into electrical energy.

* * * * *